PANEL MAGNETIC SOUND RECORDER AND REPRODUCER

Filed Dec. 19, 1950 2 Sheets-Sheet 1

INVENTOR.
James L. Pettus
BY [signature]
ATTORNEY.

INVENTOR.
James L. Pettus
BY
Orl R. Goslaw
ATTORNEY.

Patented Aug. 31, 1954 2,687,882

UNITED STATES PATENT OFFICE 2,687,882

PANEL MAGNETIC SOUND RECORDER AND REPRODUCER

James L. Pettus, Encino, Calif., assignor to Radio Corporation of America, a corporation of Delaware Application December 19, 1950, Serial No. 201,658

8 Claims. (Cl. 271—2.3)

This invention relates to magnetic sound recording and reproducing, and particularly to a panel type magnetic recorder and reproducer.

The recording of sound on magnetic record mediums, such as tape and film, is becoming more extensive. This type of recording is being substituted for photographic recording in many instances because of the inherent advantages thereof, such as immediate playback, low ground noise, and higher sound quality. Since the recording of magnetic records may be accomplished without resorting to a darkroom, the magnetic recorders and reproducers lend themselves to the panel form of equipment. That is, it is unnecessary to have the magnetic film in light-tight magazines and advance it through a light-tight recorder, such as is necessary with photographic film. Thus, different types of film advancing mechanisms may be used which are not limited to the limited space of a light-tight recorder and magazine.

The present invention is a panel form of magnetic sound recorder and reproducer, wherein exceptionally stable film motion is obtained at the recording and reproducing heads, which contributes to the high quality of the film recording and reproducing when combined with the inherent features contributed by the use of magnetic film or tape.

The principal object of the invention, therefore, is to facilitate the recording and reproducing of sound.

Another object of the invention is to provide an improved magnetic film or tape sound recorder and reproducer.

A further object of the invention is to provide an improved magnetic film drive which provides particularly uniform film motion at the recording and reproducing points on the film.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
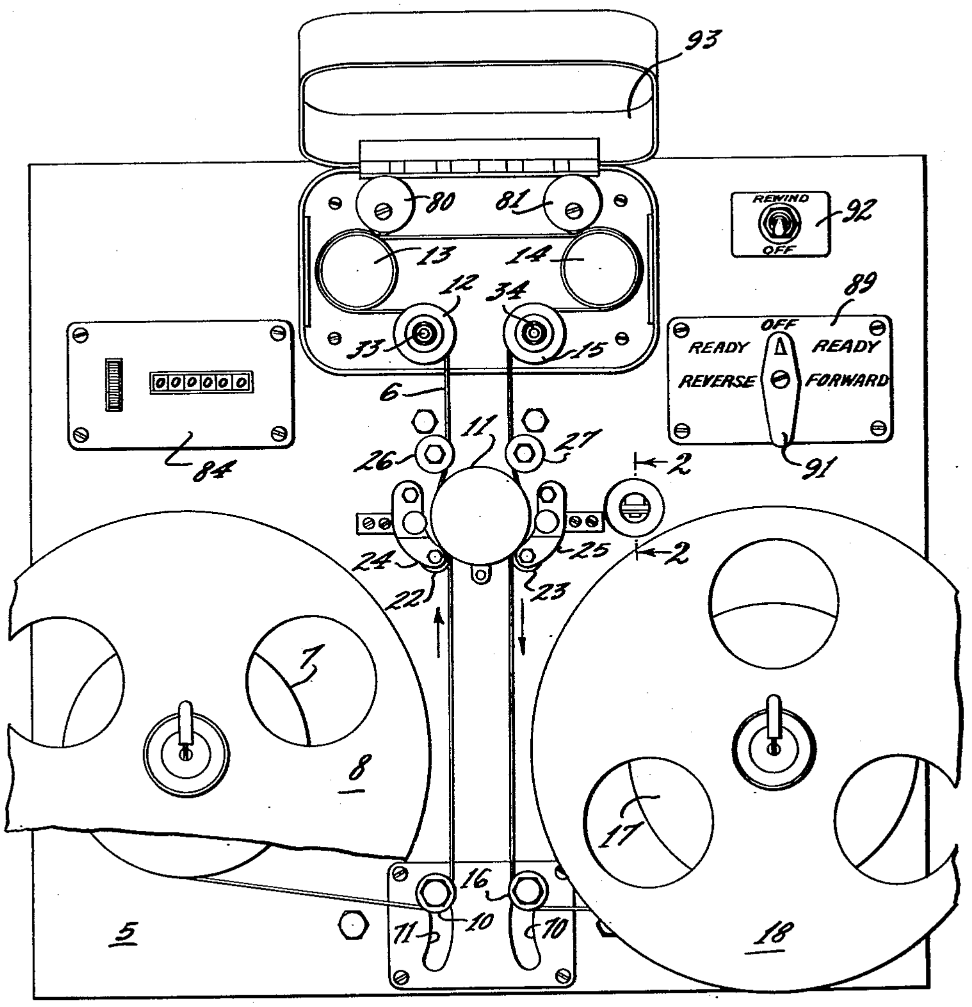
Fig. 1 is a front elevational view of a magnetic recorder and reproducer embodying the invention.
Figure 2:
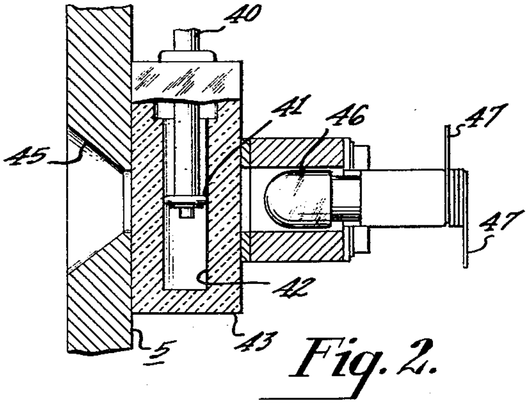
Fig. 2 is a detailed cross-sectional view of the damping element used in the invention and taken along the lines 2—2 of Figs. 1 and 3.

Referring now to the drawings, in which the same numerals identify like elements, a panel plate 5 is mounted on a vertical rack and has the recorder-reproducer mechanism attached thereto. As shown in Fig. 1, a magnetic film 6 of the form and size of sixteen millimeter or thirty-five millimeter photographic film, having perforations therein, is fed from a roll 7 on a reel 8 around a roller 10, over the left side of a sprocket 11, around a tensioned roller 12, around a drum 13, a second similar drum 14, a tensioned roller 15, the right-hand side of sprocket 11, around a tensioned roller 16, and to the roll 17 on a reel 18.

Figure 3:
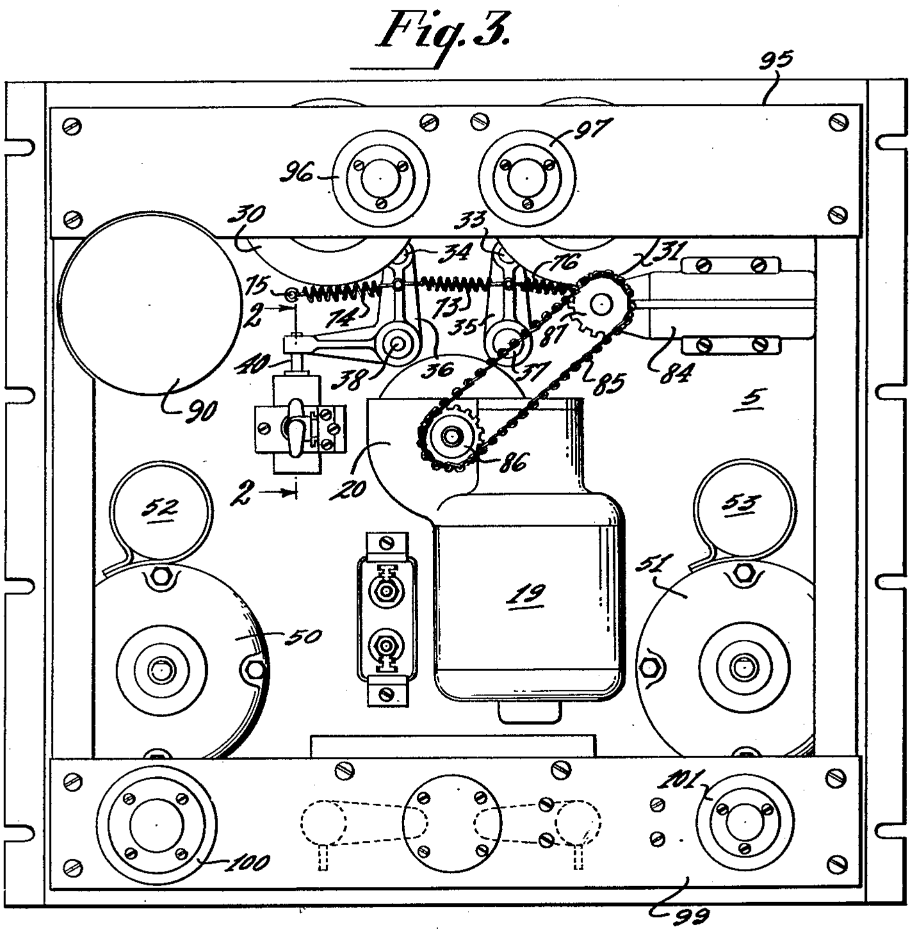
Fig. 3 is a rear elevational view of the invention as shown in Fig. 1.
Figure 4:
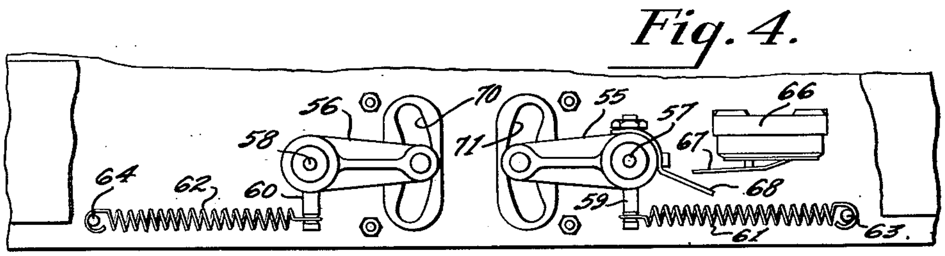
Fig. 4 is a detailed rear view of two of the guide roller mechanisms.

The sprocket 11 is driven by a motor 19 through a reduction gear box 20 (see Fig. 3). The film is held on the sprocket 11 by a pair of adjustable pad rollers 22 and 23 on arms 24 and 25, respectively, and guided from and to the sprocket 11 by a pair of fixed guide rollers 26 and 27. The drums 13 and 14 have mounted on the other end of their shafts a pair of flywheels 30 and 31, while the rollers 12 and 15 have special tensioning and damping mechanisms. In Fig. 3, the shafts of the rollers 12 and 15, shown at 33 and 34, respectively, are mounted on the ends of arms 35 and 36, which are pivoted at 37 and 38, respectively.

The arm 36 is a crank arm, the other end of which is connected to a rod 40 on the end of which is a piston 41 movable longitudinally in the cylindrical opening 42 of a transparent dashpot housing 43. The housing 43 may be a clear plastic or glass cylinder attached to the panel 5 adjacent a tapered opening 45 therein. The cylindrical opening 42 is filled with any suitable oil, such as silicone, of one hundred centistokes, and the clearance between the piston 41 and the walls of the opening 42 is such as to give critical damping of the mechanical filter system. A pilot lamp 46 is mounted at the side of the cylinder 43 and energized over conductors 47 when the motors are partially energized, which gives a visual indication of the position of the piston 41 through the opening 45.

In my U. S. Patent No. 2,657,870 of November 3, 1953, the general type of motor drive system of the present invention is described and claimed. This invention involves two torque motors 50 and 51 with their starting condensers 52 and 53, respectively. In this system, the torque motors are partially energized in order to take up the slack in the film between the sprocket 11 and the reels 8 and 18, and when this energy is applied, the lamp 46 is also partially energized. Since the position of the piston 41 may be observed, it indicates the displacement of the tensioning rollers 10 and 16 to indicate whether the threading of the film is correct for optimum performance. When the motors are fully energized to drive the film, the position of the piston 41 may also be observed to indicate whether or not the dynamic positions of the rollers are correct during the actual driving of the film.

The rollers 10 and 16 are mounted on shafts attached to the ends of arms 55 and 56, respectively, pivoted at 57 and 58, the shafts being movable in slots 70 and 71 in the panel 5. These arms have right-angle extensions 59 and 60, to the ends of which are connected tensioning springs 61 and 62 anchored at 63 and 64, respectively. The tension provided by these springs is such as to properly position the film 6 when the motors 50 and 51 are partially energized to take up the slack in the film, and also, when the motors are fully energized during running conditions. A microswitch 66 with its contact element 67 is provided, the switch breaking an electrical circuit when the contact element 68 on the arm 55 is brought into contact therewith. The elements 67 and 68 contact under the tension of spring 61, the switch being used to stop the film driving motor when the end of the film has passed roller 10 during either reproducing or rewind, depending upon the electrical circuit being used.

Referring now to the remainder of the film path, it will be noted that arms 35 and 36 are also tensioned. First, by a strong spring 73 interconnecting the arms 35 and 36, then by a weaker spring 76 connected to arm 35 and anchored on a pin not shown, and then by a still weaker spring 74 anchored on a pin 75. Thus, the motion of the film is controlled by the tensioned rollers 10 and 16 between the rolls 7 and 17 and the sprocket 11 by the flywheels 30 and 31 on the shafts of rollers 13 and 14, and by the rollers 12 and 15 tensioned by springs 73, 74, and 76, and the dashpot 43 attached to the roller 15.

Figure 5:
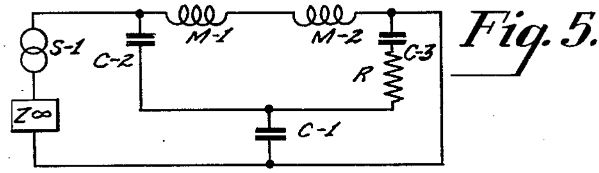
Fig. 5 is an electrical analogue of the mechanical filter in the film drive system of the invention.

The electrical analogue of this circuit, which provides particularly uniform film motion at the gaps of a magnetic record head 80 and the gap of a reproduce or monitoring head 81, is shown in Fig. 5, wherein S–1 is the sprocket generator with an infinite internal impedance indicated as $Z \infty$. The inductances M–1 and M–2 represent the flywheels 31 and 30, respectively. The tensioning spring 73 is represented by condenser C–1, while the stabilizing spring 76 is represented by condenser C–2, and the stabilizing spring 74 is represented by the condenser C–3. The dashpot is the resistor R. From the electrical circuit shown in Fig. 5, it is realized that the arrangement of the series inductances and series-parallel connections of the condensers provide a highly damped circuit for both high and low frequency vibrations, which might be introduced into the film path loop above the sprocket 11. Since the direction of the film is as shown by the arrows, the dashpot resistor is on the pulling side of the sprocket, which provides the increased damping effect. As mentioned above, the three springs have different degrees of tension. The center spring 73 provides the desired tautness of the film in the loop, while the weaker springs 74 and 76 stabilize or centralize the rollers 12 and 15 to provide the proper symmetry of drive under dynamic conditions. Since spring 76 tensions to the right in Fig. 3 between the sprocket and load (drums 13 and 14), this spring is stronger than the spring 74. Since the film motion is more constant when the film is on the drums 13 and 14, the heads 80 and 81 are positioned as closely as possible to the drums.

Various control and other elements are also shown in the drawings, such as a footage counter 84, driven by a chain 85 over sprockets 86 and 87. The switch 89 has its terminals and contacts covered by a shield 90, the switch having a lever 91, which, when in the ready position, partially energizes the torque motors 50 and 51 in accordance with the above-identified application, while it also has reverse and forward driving positions. A high speed rewind switch, as shown at 92, is also provided, while a hi-permeability cover 93, shown open in Fig. 1, shields the heads 80 and 81 from stray magnetic fields. In Fig. 3, the terminal connecting plate 95 has a monitor output plug 96 and a recording head input plug 97. A similar terminal panel 99 is provided which has a plug 100 for the motor input power and a plug 101 for the B plus and ground connections.

As previously mentioned, this magnetic recorder-reproducer may be mounted on a vertical rack, and thus, adapted for panel type operation at a level which is convenient for threading. It also provides uniform and constant film motion at the recording and reproducing heads, while providing indications when the threading is both statically and dynamically correct. During recording, the head 80 will record and the head 81 may be used for monitoring, the head 81 being the normal reproducing head.

It will be noted that the rollers 10 and 16 are shown at the top of slots 70 and 71 in Fig. 1, which are the running positions of these rollers, the springs 61 and 62 eliminating jerks and undue strains on the film during starting and stopping of the mechanism.

I claim:

1. A magnetic film drive mechanism comprising a panel on which said mechanism is mounted, sprocket means for advancing film to form said film into a loop, a pair of drums around which said film loop passes, a shaft for each of said drums, a flywheel on said shaft of each of said drums, a pair of rollers between said sprocket means and said drums, said rollers forming said film into two substantially right-angled loops between said sprocket means and said drums, pivoted arms for said rollers, tensioning means between said arms of said rollers and between said arms and fixed positions on said panel, said tensioning means urging said rollers together with a certain amount of tension, urging one of said rollers toward one of said fixed positions with a different amount of tension, and urging said other roller toward said other fixed position with a third amount of tension, and damping means attached to one of said arms.

2. A magnetic film drive mechanism in accordance with claim 1, in which a supply reel and a takeup reel are provided for said film, and a pair of tensioned rollers is provided between said reels and said sprocket means.

3. A magnetic film drive mechanism in accordance with claim 1, in which said damping means comprises a dashpot with a piston therein.

4. A film drive system for a film comprising a panel on which a film advancing and filtering mechanism is mounted, said mechanism including a pair of adjacent film reels, film sprocket means for advancing film from one reel and feeding film to said other reel, a pair of rollers, one between each of said reels and said sprocket means, spring means attached to said rollers for controlling said rollers during starting and stopping of said film, a pair of film drums, shafts for said drums, flywheels on said shafts, said sprocket means pulling film over said drums and feeding film thereto, and a second pair of tensioned filter rollers, one between each of said drums and said sprocket, said pair of tension filter rollers forming said film into two substantially right angled loops between said sprocket means and said drums, a strong spring being provided between said pair of tensioned rollers to urge said rollers together and introduce tension in said film, a weaker spring being provided urging one of said rollers away from the other of said rollers, and a still weaker spring being provided to urge the other of said rollers away from said first mentioned roller to center said rollers symmetrically with respect to said drum and said sprocket.

5. A film drive system in accordance with claim 4, in which a dashpot is attached to one of said tensioned rollers.

6. A film drive for forming a symmetrical film path comprising a supply reel and a take-up reel having their axes in a certain plane, a film drive sprocket having its axis in a plane perpendicular to said certain plane of said reel axes at a point substantially mid-way between said reel axes, a pair of film pulled drums having their axes in a plane parallel with the plane of said reel axes, said sprocket axis plane being perpendicular to said plane of said drum axes at a point mid-way between said drum axes, a pair of tensioning rollers between said drums and said sprocket and having the normal position of their axes in a plane substantially parallel with the planes of said reel axes and said drum axes, said tensioning rollers forming said film into two substantially symmetrical right-angled loops between said sprocket and said drums, and tensioning means for said rollers to urge said rollers together with a certain amount of tension and to urge said rollers apart to maintain the axes of said rollers in their plane parallel with the plane of the axes of said drums.

7. A film drive for forming a symmetrical film path comprising a supply reel and a take-up reel having their axes in a certain plane, a film drive sprocket having its axis in a plane perpendicular to said certain plane of said reel axes at a point substantially mid-way between said reel axes, a pair of film pulled drums having their axes in a plane parallel with the plane of said reel axes, said sprocket axis plane being perpendicular to said plane of said drum axes, at a point mid-way between said drum axes, a pair of tensioning rollers between said drums and said sprocket and having the normal position of their axes in a plane substantially parallel with the planes of said reel axes and said drum axes, said tensioning rollers forming said film into two substantially symmetrical right-angled loops between said sprocket and said drums, tensioning means for said rollers to urge said rollers together and to maintain the axes of said rollers in their plane parallel with the plane of the axes of said drums, tensioning means for said rollers to urge said rollers together with a certain amount of tension and to urge said rollers apart to maintain the axes of said rollers in their plane parallel with the plane of the axes of said drums, and means attached to one of said rollers for damping the tendency of the axes of said rollers to move from their plane parallel with the plane of the axes of said drums.

8. A film drive for forming a symmetrical film path comprising a supply reel and a take-up reel having their axes in a certain plane, a film drive sprocket having its axis in a plane perpendicular to said certain plane of said reel axes at a point substantially mid-way between said reel axes, a pair of film pulled drums having their axes in a plane parallel with the plane of said reel axes, said sprocket axis plane being perpendicular to said plane of said drum axes at a point mid-way between said drum axes, a pair of tensioning rollers between said drums and said sprocket and having the normal position of their axes in a plane substantially parallel with the planes of said reel axes and said drum axes, said tensioning rollers forming said film into two substantially symmetrical right-angled loops between said sprocket and said drums, tensioning means for said rollers to urge said rollers together and to maintain the axes of said rollers in their plane parallel with the plane of the axes of said drums, tensioning means for said rollers to urge said rollers together with a certain amount of tension and to urge said rollers apart to maintain the axes of said rollers in their plane parallel with the plane of the axes of said drums, means attached to one of said rollers for damping the tendency of the axes of said rollers to move from their plane parallel with the plane of the axes of said drums, and a second pair of tensioned rollers positioned between said sprocket and said reels, the normal position of the axes of said second pair of rollers being in a plane parallel with the planes of said reels, said drums, and the normal plane of said second pair of rollers.

References Cited in the file of this patent

UNITED STATES PATENTS

| Number | Name | Date |
|---|---|---|
| 1,892,554 | Kellogg | Dec. 27, 1932 |
| 1,909,074 | Reynolds | May 16, 1933 |
| 2,108,337 | Hoffman | Feb. 15, 1938 |
| 2,209,582 | Ross | July 30, 1940 |
| 2,212,617 | Otto | Aug. 27, 1940 |

FOREIGN PATENTS

| Number | Country | Date |
|---|---|---|
| 486,812 | Great Britain | June 10, 1938 |
| 506,654 | Great Britain | June 1, 1939 |
| 597,945 | Germany | June 5, 1934 |
| 624,551 | Germany | Jan. 23, 1936 |
| 650,072 | Germany | Sept. 16, 1937 |